United States Patent [19]
Cheung et al.

[11] Patent Number: 6,103,803
[45] Date of Patent: *Aug. 15, 2000

[54] FILLED POLYMER COMPOSITIONS

[75] Inventors: Yunwa Wilson Cheung, Lake Jackson; John O. Bieser, Houston; Martin James Guest, Lake Jackson, all of Tex.; Johan A. Thoen, Dommelstraat, Netherlands; John Joseph Gathers, Pearland, Tex.

[73] Assignee: The Dow Chemical Company, Midland, Mich.

[ * ] Notice: This patent is subject to a terminal disclaimer.

[21] Appl. No.: 09/327,685

[22] Filed: Jun. 8, 1999

Related U.S. Application Data

[63] Continuation of application No. 08/882,819, Jun. 26, 1997.
[51] Int. Cl.⁷ ........................................ C08K 3/00
[52] U.S. Cl. ..................... 524/425; 524/451; 524/404
[58] Field of Search ................... 524/425, 451, 524/494

[56] References Cited

U.S. PATENT DOCUMENTS

| | | | |
|---|---|---|---|
| 5,460,818 | 10/1995 | Park et al. | 426/415 |
| 5,530,055 | 6/1996 | Needham . | |
| 5,576,374 | 11/1996 | Betso et al. | 524/451 |
| 5,973,049 | 10/1999 | Biesel et al. | 524/425 |

FOREIGN PATENT DOCUMENTS

| | | |
|---|---|---|
| 2262287 | 6/1993 | United Kingdom . |
| 95/09945 | 4/1995 | WIPO . |
| 95/32095 | 11/1995 | WIPO . |
| 98/29479 | 7/1998 | WIPO . |

OTHER PUBLICATIONS

Derwent Abstract No. XP–002080125 of JP60–155210 A, published Aug. 15, 1985.
Derwent Abstract No. XP–002080126 of JP02–173138 A, published Jul. 4, 1990.
Chemical Abstracts, vol. 120, No. 24, Jun. 13, 1994.
Chemical Abstracts, vol. 119, No. 8, Aug. 23, 1993.
"Blends of Alpha–Olefin/Vinylidene Aromatic Monomer or Hindered Aliphatic Vinylidene Monomer Interpolymers With Polymers or Vinylidene Monomers" filed in United States of America on Sep. 4, 1996; Application Serial No.: 08/709418; Applicant: C. P. Park et al.
"Blends of Alpha–Olefin/Vinylidene Aromatic Monomer or Hindered Aliphatic Vinylidene Monomer Interpolymers With Polyolefins" filed in United States of America on Sep. 4, 1996; Application Serial No.: 60/025431; Applicant: C. P. Park et al.
"Blends of Alpha–Olefin/Vinylidene Aromatic Monomer or Hindered Aliphatic Vinylidene Monomer Interpolymers With Polymers of Vinylidene Aromatic Monomers" filed in WO on Sep. 4, 1996; Application No. PCT/US96/14233; Applicant: The Dow Chemical Company et al.
"Asphalt Modified With Olefin/Vinylidene Aromatic Monomer Interpolymers" filed in United States of America on Nov. 21, 1996; Application Serial No. 08/754658; Applicant Y. W. Cheung et al.
"Interpolymers of Ethylene, Olefinic Monomers and Aromatic Vinylidene or Hindered Aliphatic or Cycloaliphatic Vinylidene Monomers" filed in United States of America on Feb. 6, 1997; Application Serial No. 08/796849; Applicant Y. W. Cheung et al.
"Blends of Alpha–Olefin/Vinylidene Aromatic Monomer and/or Hindered Aliphatic or Cycloaliphatic Vinylidene Monomer Interpolymers" filed in United States of America on Sep. 4, 1996; Application Serial No.: 08/707784; Applicant: M. J. Guest et al.
"Plasticized Alpha–Olefin/Vinylidene Aromatic Monomer or Hindered Aliphatic or Cycloaliphatic Vinylidene Monomer Interpolymers" filed in United States of America on Dec. 17, 1996; Application Serial No. 08/767609; Applicant Y. W. Cheung et al.
"New Alpha–Olefin/Vinylidene Aromatic Monomer and/or Hindered Aliphatic or Cycloaliphatic Vinylidene Monomer Interpolymers" filed in United States of America on Sep. 4, 1996; Application Serial No.: 08/708869: Applicant: J. T. Patton et al.
"Thermoset Elastomers" filed in WO on Aug. 4, 1995; Application No.: PCT/US95/09945; Applicant: The Dow Chemical Company et al.
"Blends of Elastomer Block Copolymer and Aliphatic Alpha–Olefin/Monovinylidene Aromatic Monomer and/or Hindered Aliphatic Vinylidene Monomer Interpolymer" filed in United States of America on Oct. 15, 1996; Application Serial No.: 08/732108; Applicant C. P. Esneault et al.
"Highly Filled Thermoplastic Compositions" filed in United States of America on Aug. 20, 1996; Application Serial No.: 08/700141; Applicant: J. A. Dibbern et al.
"Filled Polyethylene Compositions" filed in United States of America on Feb. 28, 1997; Application Serial No.: 60/039586; Applicant: J. O. Bieser et al.

*Primary Examiner*—Edward J. Cain

[57] ABSTRACT

A filled polymer composition which comprises
A) from about 5 to about 90 percent of one or more thermoplastic substantially random interpolymers prepared by polymerizing one or more a-olefin monomers with one or more vinylidene aromatic monomers and/or one or more hindered aliphatic or cycloaliphatic vinylidene monomers, and optionally with other polymerizable ethylenically unsaturated monomer(s), and
(B) from about 10 to about 95 percent of one or more inorganic fillers,
the amounts of (A) and (B) being based on the total weight of (A) and (B).

Fabricated articles made from the filled polymer compositions are useful as sound insulating or energy absorbing films or sheets or as floor, wall or ceiling coverings.

21 Claims, No Drawings

FILLED POLYMER COMPOSITIONS

CROSS-REFERENCE TO RELATED APPLICATIONS

This application is a continuation of Ser. No. 08/882,819 filed Jun. 26, 1997.

BACKGROUND OF THE INVENTION

This invention relates to filled α-olefin/vinylidene monomer interpolymer compositions, and fabricated articles thereof.

Fillers are frequently used to improve the stiffness of polymer compositions, or to decrease the coefficient of linear thermal expansion, or to decrease the overall cost of the polymer composition. However, such fillers are well known to simultaneously decrease impact performance or toughness of the resultant composition. For example, Joseph A. Randosta & Nikhil C. Trivedi in Talc [published in Handbook of Fillers and Reinforcements for Plastics 160 (Harry S. Katz & John V. Milewski eds.)] confirm that the impact performance of polymeric materials is generally decreased by the presence of rigid fillers, especially below the glass transition temperature (Tg) of the matrix material, due to the fillers' action as "stress concentrators".

Typically, the filler is incorporated at levels ranging from 1 to 50 weight percent of the formulation, depending upon the filler density. Furthermore, even at relatively high levels of filler loading (e.g., greater than about 20 percent), typical thermoplastic formulations (e.g., polypropylene, an elastomeric rubber and talc) have very poor impact performance and do not function well in uses such as automotive facia. Low temperature impact resistance generally becomes more critical when the formulation is exposed to temperatures approaching the glass transition temperature of the rubber used in the formulation. Sometimes the room temperature impact resistance may even increase for highly filled formulations, but the low temperature impact resistance decreases rapidly with decreasing temperature.

The patent application WO 95/09945 discloses a thermoset elastomer composition which comprises a cross-linked substantially random interpolymer of (a) 15 to 70 weight percent of an α-olefin, (b) 30 to 70 weight percent of a vinylidene aromatic compound and (c) 0 to 15 weight percent of a diene. The linked substantially random interpolymer is typically mixed with a filler, an oil, and a curing agent at an elevated temperature to compound them. The amount of the curing agent is typically from about 0.5 to 12 weight percent, based on the total weight of the formulation. Carbon black may be added in an amount of up to 50 weight percent, based on the total weight of the formulation, to mask the color, to increase the toughness and/or to decrease the cost of the formulation. The disclosed thermoset formulations are useful in hoses, air ducts, brake cups, roofing materials and as various automotive parts, such as tires and moldings. However, the post-extrusion curing results in a cross-linked thermoset part that can not be reprocessed as a thermoplastic. This limits recyclability of the product.

U.S. Pat. No. 5,576,374 discloses filled thermoplastic olefinic compositions which have good low temperature impact performance and modulus. They comprise
(A) a thermoplastic resin selected from the group consisting of thermoplastic polyurethanes, polyvinyl chlorides, styrenics, engineering thermoplastics, and polyolefins,
(B) at least one substantially linear ethylene/α-olefin polymer which is characterized as having:
  a) a melt flow ratio, $I_{10}/I_2, \geq 5.63$,
  b) a molecular weight distribution, $M_w/M_n$, defined by the equation: $M_w/M_n \leq (I_{10}/I_2)-4.63$, and
  c) a critical shear rate at onset of surface melt fracture of at least 50 percent greater than the critical shear rate at the onset of surface melt fracture of a linear ethylene/α-olefin polymer having about the same $I_2$ and $M_w/M_n$, and
(C) at least one filler.

The filled thermoplastic olefinic compositions are said to be useful as automotive bumpers, facia, wheel covers and grilles and freezer containers.

In view of the wide ranges of desirable properties and uses for thermoplastic polymers, it would be desirable to provide new filled polymer compositions.

SUMMARY OF THE INVENTION

In one aspect, the present invention relates to a filled polymer composition which comprises
(A) from about 5 to about 90 percent of one or more thermoplastic substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s), and
(B) from about 10 to about 95 percent of one or more inorganic fillers, the amounts of (A) and (B) being based on the total weight of (A) and (B).

In another aspect, the present invention relates to a fabricated article made from such filled polymer composition.

In yet another aspect, the present invention relates to a multilayered structure wherein at least one layer is made from such filled polymer composition.

DETAILED DESCRIPTION OF THE INVENTION

It has been surprisingly found that thermoplastic substantially random interpolymers which have been prepared by polymerizing one or more a-olefin monomers with one or more vinylidene aromatic monomers and/or one or more hindered aliphatic or cycloaliphatic vinylidene monomers, and optionally with other polymerizable ethylenically unsaturated monomer(s) can be blended with high levels of one or more inorganic fillers and that fabricated articles made from filled polymer compositions comprising one or more of such thermoplastic interpolymers and one or more inorganic fillers in the above-mentioned weight ratios have a substantially improved hardness and tensile modulus while generally maintaining good elongation properties, such as strain at break, stress at break and energy at break, as compared to fabricated articles made from a corresponding thermoplastic interpolymer without inclusion of a filler.

It has also been surprisingly found that fabricated articles made from filled polymer compositions which comprise one or more of such thermoplastic interpolymers and one or more inorganic fillers in the above-mentioned weight ratios often have a better scratch resistance than filled thermoplastic olefinic compositions disclosed in U.S. Pat. No. 5,576,374.

The term "interpolymer" is used herein to indicate a polymer wherein at least two different monomers are polymerized to make the interpolymer.

The above-mentioned interpolymer(s) suitable in the filled polymer composition of the present invention are thermoplastic, that means they may be molded or otherwise shaped and reprocessed at temperatures above their melting or softening point. They are not cross-linked to a substantial degree, which means that the filled polymer compositions of the present invention do not contain more than 0.4 percent, preferably not more than 0.2 percent, more preferably not more than 0.05 percent of a cross-linking agent, based on the weight of the interpolymer(s). Most preferably, the filled polymer compositions of the present invention do not contain any measurable amount of a cross-linking agent.

The interpolymers employed in the present invention include, but are not limited to substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s).

Suitable α-olefin monomers include, for example, α-olefin monomers containing from 2 to about 20, preferably from 2 to about 12, more preferably from 2 to about 8 carbon atoms. Preferred such monomers include ethylene, propylene, butene-1, 4-methyl-1-pentene, hexene-1 and octene-1. Most preferred are ethylene or a combination of ethylene with $C_{3-8}$-α-olefins. These α-olefins do not contain an aromatic moiety.

Suitable vinylidene aromatic monomers which can be employed to prepare the interpolymers employed in the filled polymer compositions of the present invention include, for example, those represented by the following formula:

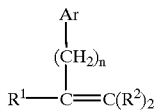

wherein $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; Ar is a phenyl group or a phenyl group substituted with from 1 to 5 substituents selected from the group consisting of halo, $C_{1-4}$-alkyl, and $C_{1-4}$-haloalkyl; and n has a value from zero to about 4, preferably from zero to 2, most preferably zero. Exemplary monovinylidene aromatic monomers include styrene, vinyl toluene, α-methylstyrene, t-butyl styrene, chlorostyrene, including all isomers of these compounds, and the like. Particularly suitable such monomers include styrene and lower alkyl- or halogen-substituted derivatives thereof. Preferred monomers include styrene, a-methyl styrene, the lower alkyl-($C_1$–$C_4$) or phenyl-ring substituted derivatives of styrene, such as for example, ortho-, meta-, and para-methylstyrene, the ring halogenated styrenes, paravinyl toluene or mixtures thereof, and the like. A more preferred aromatic monovinylidene monomer is styrene.

By the term "hindered aliphatic or cycloaliphatic vinylidene monomers", it is meant addition polymerizable vinylidene monomers corresponding to the formula:

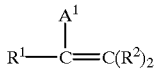

wherein $A^1$ is a sterically bulky, aliphatic or cycloaliphatic substituent of up to 20 carbons, $R^1$ is selected from the group of radicals consisting of hydrogen and alkyl radicals containing from 1 to about 4 carbon atoms, preferably hydrogen or methyl; each $R^2$ is independently selected from the group of radicals consisting of hydrogen and alkyl radicals containing from 1 to about 4 carbon atoms, preferably hydrogen or methyl; or alternatively $R^1$ and $A^1$ together form a ring system. By the term "sterically bulky" is meant that the monomer bearing this substituent is normally incapable of addition polymerization by standard Ziegler-Natta polymerization catalysts at a rate comparable with ethylene polymerizations. α-olefin monomers containing from 2 to about 20 carbon atoms and having a linear aliphatic structure such as propylene, butene-1, hexene-1 and octene-1 are not considered as hindered aliphatic monomers. Preferred hindered aliphatic or cycloaliphatic vinylidene compounds are monomers in which one of the carbon atoms bearing ethylenic unsaturation is tertiary or quaternary substituted. Examples of such substituents include cyclic aliphatic groups such as cyclohexyl, cyclohexenyl, cyclooctenyl, or ring alkyl or aryl substituted derivatives thereof, tert-butyl, norbornyl, and the like. Most preferred hindered aliphatic or cycloaliphatic vinylidene compounds are the various isomeric vinyl-ring substituted derivatives of cyclohexene and substituted cyclohexenes, and 5-ethylidene-2-norbornene. Especially suitable are 1-, 3-, and 4-vinylcyclohexene.

The interpolymers of one or more a-olefins and one or more monovinylidene aromatic monomers and/or one or more hindered aliphatic or cycloaliphatic vinylidene monomers employed in the present invention are substantially random polymers. These interpolymers usually contain from about 0.5 to about 65, preferably from about 1 to about 55, more preferably from about 2 to about 50, most preferably from about 20 to about 50 mole percent of at least one vinylidene aromatic monomer and/or hindered aliphatic or cycloaliphatic vinylidene monomer and from about 35 to about 99.5, preferably from about 45 to about 99, more preferably from about 50 to about 98, most preferably from about 50 to about 80 mole percent of at least one aliphatic a-olefin having from 2 to about 20 carbon atoms.

Other optional polymerizable ethylenically unsaturated monomer(s) include strained ring olefins such as norbornene and $C_{1-10}$ alkyl or $C_{6-10}$ aryl substituted norbornenes, with an exemplary interpolymer being ethylene/styrene/norbornene.

The number average molecular weight (Mn) of the interpolymers is usually greater than about 5,000, preferably from about 20,000 to about 1,000,000, more preferably from about 50,000 to about 500,000. The melt index $I_2$ according to ASTM D 1238 Procedure A, condition E, generally is from about 0.01 to about 50 g/10 min., preferably from about 0.01 to about 20 g/10 min., more preferably from about 0.1 to about 10 g/10 min., and most preferably from about 0.5 to about 5 g/10 min. The glass transition temperature (Tg) of the interpolymers is preferably from about −40° C. to about +35° C., preferably from about 0° C. to about +30° C., most preferably from about +10° C. to about +25° C., measured according to differential mechanical scanning (DMS).

Polymerizations and unreacted monomer removal at temperatures above the autopolymerization temperature of the respective monomers may result in formation of some amounts of homopolymer polymerization products resulting from free radical polymerization. For example, while preparing the substantially random interpolymer, an amount of atactic vinylidene aromatic homopolymer may be formed due to homopolymerization of the vinylidene aromatic monomer at elevated temperatures. The presence of vinylidene aromatic homopolymer is in general not detrimental for the purposes of the present invention and can be tolerated. The vinylidene aromatic homopolymer may be separated from the interpolymer, if desired, by extraction techniques such as selective precipitation from solution with a non solvent for either the interpolymer or the vinylidene aromatic homopolymer. For the purpose of the present invention it is preferred that no more than 20 weight percent, preferably less than 15 weight percent based on the total weight of the interpolymers of vinylidene aromatic homopolymer is present.

The substantially random interpolymers may be modified by typical grafting, hydrogenation, functionalizing, or other reactions well known to those skilled in the art. The polymers may be readily sulfonated or chlorinated to provide functionalized derivatives according to established techniques.

The substantially random interpolymers can be prepared as described in U.S. application Ser. No. 07/545,403 filed Jul. 3, 1990 (corresponding to EP-A-0,416,815) by James C. Stevens et al. and in allowed U.S. application Ser. No. 08/469,828, filed Jun. 6, 1995, all of which are incorporated herein by reference in their entirety. Preferred operating conditions for such polymerization reactions are pressures from atmospheric up to 3,000 atmospheres and temperatures from −30° C. to 200° C.

Examples of suitable catalysts and methods for preparing the substantially random interpolymers are disclosed in U.S. application Ser. No. 07/545,403, filed Jul. 3, 1990 (corresponding to EP-A-416,815); U.S. application Ser. No. 547,718, filed Jul. 3, 1990 (corresponding to EP-A-468, 651); U.S. application Ser. No. 07/702,475, filed May 20, 1991 (corresponding to EP-A-514,828); U.S. application Ser. No. 07/876,268, filed May 1, 1992 (corresponding to EP-A-520,732); U.S. application Ser. No. 884,966, filed May 15, 1992 (corresponding to WO 93/23412); U.S. Pat. No. 5,374,696, filed Jan. 21, 1993; U.S. application Ser. No. 34,434, filed Mar. 19, 1993 (corresponding to WO 94/01647); U.S. application Ser. No. 08/241,523, filed May 12, 1994, (corresponding to WO 94/06834 and EP 0,705, 269); as well as U.S. Pat. Nos. 5,055,438; 5,057,475; 5,096,867; 5,064,802; 5,132,380; and 5,189,192; 5,321,106; 5,347,024; 5,350,723; 5,374,696; 5,399,635; 5,460,993 and 5,556,928 all of which patents and applications are incorporated herein by reference in their entirety.

The substantially random a-olefin/vinylidene aromatic interpolymers can also be prepared by the methods described by John G. Bradfute et al. (W. R. Grace & Co.) in WO 95/32095; by R. B. Pannell (Exxon Chemical Patents, Inc.) in WO 94/00500; and in Plastics Technology, page 25 (September 1992), all of which are incorporated herein by reference in their entirety.

Also suitable are the substantially random interpolymers which comprise at least one a-olefin/vinyl aromatic/vinyl aromatic/α-olefin tetrad disclosed in U.S. application Ser. No. 08/708,809, filed Sep. 4, 1996 by Francis J. Timmers et al. These interpolymers contain additional signals with intensities greater than three times the peak to peak noise. These signals appear in the chemical shift range 43.75 to 44.25 ppm and 38.0 to 38.5 ppm. Specifically, major peaks are observed at 44.1, 43.9 and 38.2 ppm. A proton test NMR experiment indicates that the signals in the chemical shift region 43.75 to 44.25 ppm are methine carbons and the signals in the region 38.0 to 38.5 ppm are methylene carbons.

In order to determine the carbon-[13] NMR chemical shifts of the interpolymers described, the following procedures and conditions are employed. A five to ten weight percent polymer solution is prepared in a mixture consisting of 50 volume percent 1,1,2,2-tetrachloroethane-$d_2$ and 50 volume percent 0.10 molar chromium tris(acetylacetonate) in 1,2,4-trichlorobenzene. NMR spectra are acquired at 130° C. using an inverse gated decoupling sequence, a 900 pulse width and a pulse delay of five seconds or more. The spectra are referenced to the isolated methylene signal of the polymer assigned at 30.000 ppm.

It is believed that these new signals are due to sequences involving two head-to-tail vinyl aromatic monomer preceded and followed by at least one a-olefin insertion, e.g. an ethylene/styrene/styrene/ethylene tetrad wherein the styrene monomer insertions of said tetrads occur exclusively in a 1,2 (head to tail) manner. It is understood by one skilled in the art that for such tetrads involving a vinyl aromatic monomer other than styrene and an α-olefin other than ethylene that the ethylene/vinyl aromatic monomer/vinyl aromatic monomer/ethylene tetrad will give rise to similar carbon-[13] NMR peaks but with slightly different chemical shifts.

These interpolymers are prepared by conducting the polymerization at temperatures of from about −30° C. to about 250° C. in the presence of such catalysts as those represented by the formula

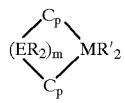

wherein: each Cp is independently, each occurrence, a substituted cyclopentadienyl group π-bound to M; E is C or Si; M is a group IV metal, preferably Zr or Ef, most preferably Zr; each R is independently, each occurrence, H, hydrocarbyl, silahydrocarbyl, or hydrocarbylsilyl, containing up to about 30 preferably from 1 to about 20 more preferably from 1 to about 10 carbon or silicon atoms; each R' is independently, each occurrence, H, halo, hydrocarbyl, hyrocarbyloxy, silahydrocarbyl, hydrocarbylsilyl containing up to about 30, preferably from 1 to about 20, more preferably from 1 to about 10, carbon or silicon atoms or two R' groups together can be a $C_{1-10}$ hydrocarbyl substituted 1,3-butadiene; m is 1 or 2; and optionally, but preferably in the presence of an activating cocatalyst, such as tris (pentafluorophenyl) borane or methylalumoxane (MAO). Particularly suitable substituted cyclopentadienyl groups include those illustrated by the formula:

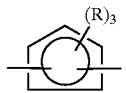

wherein each R is independently, each occurrence, H, hydrocarbyl, silahydrocarbyl, or hydrocarbylsilyl, containing up to about 30 preferably from 1 to about 20 more preferably from 1 to about 10 carbon or silicon atoms or two R groups together form a divalent derivative of such group. Preferably, R independently each occurrence is (including where appropriate all isomers) hydrogen, methyl, ethyl, propyl, butyl, pentyl, hexyl, benzyl, phenyl or silyl or (where appropriate) two such R groups are linked together forming a fused ring system such as indenyl, fluorenyl, tetrahydroindenyl, tetrahydrofluorenyl, or octahydrofluorenyl.

Particularly preferred catalysts include, for example, racemic-(dimethylsilanediyl(2-methyl-4-phenylindenyl))

zirconium dichloride, racemic-(dimethylsilanediyl(2-methyl-4-phenylindenyl))zirconium 1,4-diphenyl-1,3-butadiene, racemic-(dimethylsilanediyl(2-methyl-4-phenylindenyl))zirconium di-C$_{1-4}$ alkyl, racemic-(dimethylsilanediyl(2-methyl-4-phenylindenyl))zirconium di-C1–4 alkoxide, or any combination thereof and the like.

Further preparative methods for the interpolymer component (A) of the present invention have been described in the literature. Longo and Grassi (Makromol. Chem., Volume 191, pages 2387 to 2396 [1990]) and D'Anniello et al. (Journal of Applied Polymer Science, Volume 58, pages 1701 to 1706 [1995]) reported the use of a catalytic system based on methylalumoxane (MAO) and cyclopentadienyltitanium trichloride (CpTiCl$_3$) to prepare an ethylene-styrene copolymer. Xu and Lin (Polymer Preprints, Am.Chem.Soc., Div.Polym.Chem., volume 35, pages 686, 687 [1994]) have reported copolymerization using a MgCl$_2$/TiCl$_4$/NdCl$_3$/Al(iBu)$_3$ catalyst to give random copolymers of styrene and propylene. Lu et al. (Journal of Applied Polymer Science, volume 53, pages 1453 to 1460 [1994]) have described the copolymerization of ethylene and styrene using a TiCl$_4$/NdCl$_3$/ MgCl$_2$ /Al(Et)$_3$ catalyst. Sernetz and Mulhaupt, (Macromol. Chem. Phys., volume 197, pages 1071 to 1083 [1997]) have described the influence of polymerization conditions on the copolymerization of styrene with ethylene using Me$_2$Si (Me$_4$Cp) (N-tert-butyl)TiCl$_2$/methylaluminoxane Ziegler-Natta catalysts. The manufacture of α-olefin/vinyl aromatic monomer interpolymers such as propylene/styrene and butene/styrene are described in U.S. Pat. No. 5,244,996, issued to Mitsui Petrochemical Industries Ltd. All the above methods disclosed for preparing the interpolymer component are incorporated herein by reference.

The filled polymer composition of the present invention comprises
(A) from about 5 to about 90 percent, of one or more of the above-described thermoplastic interpolymers, and
(B) from about 10 to about 95 percent of one or more inorganic fillers, the amounts of (A) and (B) being based on the total weight of (A) and (B).

The preferred amounts of inorganic filler depend on the desired end-use of the filled polymer compositions of the present invention.

For example, when producing floor, wall or ceiling tiles, the amount of the inorganic filler(s) (B) preferably is from about 50 to about 95 percent, more preferably from about 70 to about 90 percent, based on the total weight of (A) and (B). On the other hand, when producing floor, wall or ceiling sheetings, the amount of the inorganic filler(s) (B) preferably is from about 10 to about 70 percent, more preferably from about 15 to about 50 percent, based on the total weight of (A) and (B). For several applications filler contents of from about 40 to about 90 percent, more preferably from about 55 to about 85 percent, based on the total weight of (A) and (B), are preferred.

Preferred inorganic fillers are ionic inorganic materials. Preferred examples of inorganic fillers are talc, calcium carbonate, alumina trihydrate, glass fibers, marble dust, cement dust, clay, feldspar, silica or glass, fumed silica, alumina, magnesium oxide, magnesium hydroxide, antimony oxide, zinc oxide, barium sulfate, aluminum silicate, calcium silicate, titanium dioxide, titanates, glass microspheres or chalk. Of these fillers, barium sulfate, talc, calcium carbonate, silica/glass, glass fibers, alumina and titanium dioxide, and mixtures thereof are preferred. The most preferred inorganic fillers are talc, calcium carbonate, barium sulfate, glass fibers or mixtures thereof.

It has been surprisingly found that the α-olefin/vinylidene aromatic interpolymers display a high compatibility with inorganic fillers. The composition of the present invention may contain a coupling agent, such as maleic anhydride grafted polyethylene or maleic anhydride grafted polypropylene or a known silane/silicone coupling agent. However, the presence of a coupling agent is not required, even if the filler content is 55 weight percent or more. Even in the absence of a coupling agent fabricated articles of the present invention still exhibit good filler holding and good solid state properties. This is unexpected, since many of the above-mentioned a-olefin/vinylidene aromatic interpolymers are largely unfunctionalized.

The filled polymer composition of the present invention may optionally contain up to about 50 weight percent, preferably up to about 30 weight percent, more preferably up to about 20 weight percent, most preferably up to about 10 weight percent, of one or more further polymeric components, such as those described further below. However, the total amount of the α-olefin/vinylidene aromatic interpolymer(s) (A) and the inorganic filler(s) (B) generally is at least about 50 percent, preferably at least about 70 percent, more preferably at least about 80 percent and most preferably at least about 90 percent, based on the total weight of the filled polymer composition of the present invention.

Preferred additional, optional polymers are monovinylidene aromatic polymers or styrenic block copolymers. The most preferred additional, optional polymers are homopolymers or interpolymers of aliphatic α-olefins having from 2 to about 20 carbon atoms or α-olefins having from 2 to about 20 carbon atoms and containing polar groups.

Suitable monovinylidene aromatic polymers include homopolymers or interpolymers of one or more monovinylidene aromatic monomers, or interpolymers of one or more monovinylidene aromatic monomers and one or more monomers interpolymerizable therewith other than an aliphatic α-olefin. Suitable monovinylidene aromatic monomers are represented by the following formula:

wherein R$^1$ and Ar have the meanings stated in formula I above. Exemplary monovinylidene aromatic monomers are those listed under formula I above, particularly styrene.

Examples of suitable interpolymerizable comonomers other than a monovinylidene aromatic monomer include, for example, C$_4$–C$_6$ conjugated dienes, especially butadiene or isoprene; ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. C$_1$–C$_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide, etc. Preferred monomers include maleic anhydride, methyl methacrylate, N-phenyl maleimide and acrylonitrile. In some cases it is also desirable to copolymerize a cross-linking monomer such as a divinyl benzene into the monovinylidene aromatic polymer.

The polymers of monovinylidene aromatic monomers with other interpolymerizable comonomers preferably contain, polymerized therein, at least 50 percent by weight and, preferably, at least 90 percent by weight of one or more monovinylidene aromatic monomers.

Styrenic block polymers are also useful as an additional, optional polymer in the filled polymer composition of the present invention. The term "block copolymer" is used herein to mean elastomers having at least one block segment of a hard polymer unit and at least one block segment of a rubber monomer unit. However, the term is not intended to include thermoelastic ethylene interpolymers which are, in general, random polymers. Preferred block copolymers contain hard segments of styrenic type polymers in combination with saturated or unsaturated rubber monomer segments. The structure of the block copolymers useful in the present invention is not critical and can be of the linear or radial type, either diblock or triblock, or any combination of thereof.

Suitable unsaturated block copolymers include those represented by the following formulas:

A-B-R(-B-A)$_n$ or
A$_x$-(BA-)$_y$-BA wherein each A is a polymer block comprising a monovinylidene aromatic monomer, preferably styrene, and each B is a polymer block comprising a conjugated diene, preferably isoprene or butadiene, and optionally a monovinylidene aromatic monomer, preferably styrene; R is the remnant of a multifunctional coupling agent; n is an integer from 1 to about 5; x is zero or 1; and y is a number from zero to about 4.

Methods for the preparation of such block copolymers are known in the art. Suitable catalysts for the preparation of useful block copolymers with unsaturated rubber monomer units include lithium based catalysts and especially lithium-alkyls. U.S. Pat. No. 3,595,942 describes suitable methods for hydrogenation of block copolymers with unsaturated rubber monomer units to from block copolymers with saturated rubber monomer units. The structure of the polymers is determined by their methods of polymerization. For example, linear polymers result by sequential introduction of the desired rubber monomer into the reaction vessel when using such initiators as lithium-alkyls or dilithiostilbene and the like, or by coupling a two segment block copolymer with a difunctional coupling agent. Branched structures, on the other hand, may be obtained by the use of suitable coupling agents having a functionality with respect to the block copolymers with unsaturated rubber monomer units of three or more. Coupling may be effected with multifunctional coupling agents such as dihaloalkanes or alkenes and divinyl benzene as well as with certain polar compounds such as silicon halides, siloxanes or esters of monohydric alcohols with carboxylic acids. The presence of any coupling residues in the polymer may be ignored for an adequate description of the block copolymers forming a part of the composition of this invention.

Suitable block copolymers having unsaturated rubber monomer units includes, but is not limited to, styrene-butadiene (SB), styrene-isoprene(SI), styrene-butadiene-styrene (SBS), styrene-isoprene-styrene (SIS), α-methylstyrene-butadiene-α-methylstyrene and α-methylstyrene-isoprene-α-methylstyrene, and the like.

The styrenic portion of the block copolymer is preferably a polymer or interpolymer of styrene and its analogs and homologs including a-methylstyrene and ring-substituted styrenes, particularly ring-methylated styrenes. The preferred styrenics are styrene and α-methylstyrene, and styrene is particularly preferred.

Block copolymers with unsaturated rubber monomer units may comprise homopolymers of butadiene or isoprene or they may comprise copolymers of one or both of these two dienes with a minor amount of styrenic monomer.

Preferred block copolymers with saturated rubber monomer units comprise at least one segment of a styrenic unit and at least one segment of an ethylene-butene or ethylene-propylene copolymer. Preferred examples of such block copolymers with saturated rubber monomer units include styrene/ethylene-butene copolymers, styrene/ethylene-propylene copolymers, styrene/ethylene-butene/styrene (SEBS) copolymers, styrene/ethylene-propylene/styrene (SEPS) copolymers, and the like.

Hydrogenation of block copolymers with unsaturated rubber monomer units is preferably effected by use of a catalyst comprising the reaction products of an aluminum alkyl compound with nickel or cobalt carboxylates or alkoxides under such conditions as to substantially completely hydrogenate at least 80 percent of the aliphatic double bonds while hydrogenating no more than about 25 percent of the styrenic aromatic double bonds. Preferred block copolymers are those where at least 99 percent of the aliphatic double bonds are hydrogenated while less than 5 percent of the aromatic double bonds are hydrogenated.

The proportion of the styrenic blocks is generally between about 8 and 65 percent by weight of the total weight of the block copolymer. Preferably, the block copolymers contain from 10 to 35 weight percent of styrenic block segments and from 90 to 65 weight percent of rubber monomer block segments, based on the total weight of the block copolymer.

The average molecular weights of the individual blocks may vary within certain limits. In most instances, the styrenic block segments will have number average molecular weights in the range of about 5,000 to about 125,000, preferably from about 7,000 to about 60,000 while the rubber monomer block segments will have average molecular weights in the range of about 10,000 to about 300,000, preferably from about 30,000 to about 150,000. The total average molecular weight of the block copolymer is typically in the range of about 25,000 to about 250,000, preferably from about 35,000 to about 200,000.

Further, the various block copolymers suitable for use in the present invention may be modified by graft incorporation of minor amounts of functional groups, such as, for example, maleic anhydride by any of the methods well known in the art.

Block copolymers useful in the present invention are commercially available, such as, for example, supplied by Shell Chemical Company under the designation of KRATON™ and supplied by Dexco Polymers under the designation of VECTOR™.

Preferred additional, optional polymers are homopolymers or interpolymers of aliphatic α-olefins having from 2 to about 20, preferably 2 to about 18, more preferably 2 to about 12, carbon atoms or α-olefins having from 2 to about 20, preferably 2 to about 18, more preferably 2 to about 12, carbon atoms and containing polar groups.

Suitable aliphatic α-olefin monomers which introduce polar groups into the polymer include, for example, ethylenically unsaturated nitriles such as acrylonitrile, methacrylonitrile, ethacrylonitrile, etc.; ethylenically unsaturated anhydrides such as maleic anhydride; ethylenically unsaturated amides such as acrylamide, methacrylamide etc.; ethylenically unsaturated carboxylic acids (both mono- and difunctional) such as acrylic acid and methacrylic acid, etc.; esters (especially lower, e.g. $C_1$–$C_6$, alkyl esters) of ethylenically unsaturated carboxylic acids such as methyl methacrylate, ethyl acrylate, hydroxyethylacrylate, n-butyl acrylate or methacrylate, 2-ethyl-hexylacrylate etc.; ethylenically unsaturated dicarboxylic acid imides such as N-alkyl or N-aryl maleimides such as N-phenyl maleimide, etc. Preferably such monomers containing polar groups are acrylic acid, vinyl acetate, maleic anhydride and acrylonitrile. Halogen groups which can be included in the polymers from aliphatic α-olefin monomers include fluorine, chlorine and bromine; preferably such polymers are chlorinated polyethylenes (CPEs) or polyvinyl chloride. Preferred olefinic polymers for use in the present invention are homopolymers or interpolymers of an aliphatic, including cycloaliphatic, a-olefin having from 2 to 18 carbon atoms. Suitable examples are homopolymers of ethylene or propylene, and interpolymers of two or more α-olefin monomers. Other preferred olefinic polymers are interpolymers of ethylene and one or more other α-olefins having from 3 to 8 carbon atoms. Preferred comonomers include 1-butene, 4-methyl-1-pentene, 1-hexene, and 1-octene. The olefinic polymer may also contain, in addition to the a-olefin, one or more non-aromatic monomers interpolymerizable therewith. Such additional interpolymerizable monomers include, for example, $C_4$–$C_{20}$ dienes, preferably, butadiene or 5 ethylidene-2-norbornene. The olefinic polymers can be further characterized by their degree of long or short chain branching and the distribution thereof.

One class of olefinic polymers is generally produced by a high pressure polymerization process using a free radical initiator resulting in the traditional long chain branched low density polyethylene (LDPE). LDPE employed in the present composition usually has a density of less than 0.94 g/cc (ASTM D 792) and a melt index of from 0.01 to 100, and preferably from 0.1 to 50 grams per 10 minutes (as determined by ASTM Test Method D 1238, condition I).

Another class is the linear olefin polymers which have an absence of long chain branching, as the traditional linear low density polyethylene polymers (heterogeneous LLDPE) or linear high density polyethylene polymers (HDPE) made using Ziegler polymerization processes (for example, U.S. Pat. No. 4,076,698 (Anderson et al.), sometimes called heterogeneous polymers.

HDPE consists mainly of long linear polyethylene chains. The HDPE employed in the present composition usually has a density of at least 0.94 grams per cubic centimeter (g/cc) as determined by ASTM Test Method D 1505, and a melt index (ASTM-1238, condition I) in the range of from 0.01 to 100, and preferably from 0.1 to 50 grams per 10 minutes.

The heterogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

A further class is that of the uniformly branched or homogeneous polymers (homogeneous LLDPE). The homogeneous polymers contain no long chain branches and have only branches derived from the monomers (if having more than two carbon atoms). Homogeneous polymers include those made as described in U.S. Pat. No. 3,645,992 (Elston), and those made using single-site catalysts in a reactor having relatively high olefin concentrations [as described in U.S. Pat. Nos. 5,026,798 and 5,055,438 (Canich)]. The uniformly branched/homogeneous polymers are those polymers in which the comonomer is randomly distributed within a given interpolymer molecule and wherein the interpolymer molecules have a similar ethylene/comonomer ratio within that interpolymer.

The homogeneous LLDPE employed in the present composition generally has a density of from 0.85 to 0.94 g/cc (ASTM D 792), and a melt index (ASTM-1238, condition I) in the range of from 0.01 to 100, and preferably from 0.1 to 50 grams per 10 minutes. Preferably the LLDPE is an interpolymer of ethylene and one or more other α-olefins having from 3 to 18 carbon atoms, more preferably from 3–8 carbon atoms. Preferred comonomers include 1-butene, 4-methyl-1-pentene, 1-hexene, and 1-octene.

Further, there is the class of substantially linear olefin polymers (SLOP) that may advantageously be used in component (B) of the blends of the present invention. These polymers have a processability similar to LDPE, but the strength and toughness of LLDPE. Similar to the traditional homogeneous polymers, the substantially linear ethylene/α-olefin interpolymers have only a single melting peak, as opposed to traditional Ziegler polymerized heterogeneous linear ethylene/α-olefin interpolymers which have two or more melting peaks (determined using differential scanning calorimetry). Substantially linear olefin polymers are disclosed in U.S. Pat. Nos. 5,380,810; 5,272,236 and 5,278,272 which are incorporated herein by reference.

The density of the SLOP as measured in accordance with ASTM D-792 is generally from 0.85 g/cc to 0.97 g/cc, preferably from 0.85 g/cc to 0.955 g/cc, and especially from 0.85 g/cc to 0.92 g/cc.

The melt index, according to ASTM D-1238, Condition 190° C./2.16 kg (also known as 12), of the SLOP is generally from 0.01 g/10 min. to 1000 g/10 min., preferably from 0.01 g/10 min. to 100 g/10 min., and especially from 0.01 g/10 min. to 10 g/10 min.

Also, included are the ultra low molecular weight ethylene polymers and ethylene/α-olefin interpolymers described in the WO patent application no. 97/01181 entitled Ultra-low Molecular Weight Polymers, filed on Jan. 22, 1997, which is incorporated herein by reference. These ethylene/α-olefin interpolymers have 12 melt indices greater than 1,000, or a number average molecular weight (Mn) less than 11,000.

The more preferred homopolymers or interpolymers of aliphatic α-olefins having from 2 to about 20 carbon atoms and optionally containing polar groups are homopolymers of ethylene; homopolymers of propylene, copolymers of ethylene and at least other a-olefin containing from 4 to about 8 carbon atoms; copolymers of propylene and at least other α-olefin containing from 4 to about 8 carbon atoms; copolymers of ethylene and at least one of acrylic acid, vinyl acetate, maleic anhydride or acrylonitrile; copolymers of propylene and at least one of acrylic acid, vinyl acetate, maleic anhydride or acrylonitrile; and terpolymers of ethylene, propylene and a diene. Especially preferred are LDPE, HDPE, heterogeneous and homogeneous LLDPE, SLOP, polypropylene (PP), especially isotactic polypropylene and rubber-toughened polypropylenes, or ethylene-propylene interpolymers (EP), or ethylene-vinyl acetate copolymers, or ethylene-acrylic acid copolymers, or any combination thereof.

The filled polymer composition of the present invention may contain one or more additives, for example antioxidants, such as hindered phenols or phosphites; light stabilizers, such as hindered amines; plasticizers, such as dioctylphthalate or epoxidized soy bean oil; tackifiers, such as known hydrocarbon tackifiers; waxes, such as polyethylene waxes; processing aids, such as oils, stearic acid or a metal salt thereof; crosslinking agents, such as peroxides or silanes; colorants or pigments to the extent that they do not interfere with desired physical properties of the filled polymer composition of the present invention. The additives are employed in functionally equivalent amounts known to those skilled in the art, generally in amounts of up to about 30, preferably from about 0.01 to about 5, more preferably from about 0.02 to about 1 percent by weight, based upon the total weight of the filled polymer composition.

The filled polymer compositions can be compounded by any convenient method, such as dry blending of interpolymer(s), the filler(s) and optional additives and subsequently melt mixing, either directly in the extruder used to make the finished article, or by pre-melt mixing in a separate extruder (e.g., a Banbury mixer). Dry blends of the compositions can also be directly injection molded without pre-melt mixture.

The blends can be processed to fabricated articles by any suitable means known in the art. For example, the filled polymer composition can be processed to films or sheets or to one or more layers of a multilayered structure by know processes, such as calendering, blowing, casting or (co-) extrusion processes. Injection molded, compression molded, extruded or blow molded parts can also be prepared from the filled polymer compositions of the present invention. Alternatively, the filled polymer compositions can be processed to foams or fibers. Useful temperatures for processing the interpolymer(s) in combination with the filler(s) and optional additives to the fabricated articles generally are from about 100° C. to about 300° C., preferably from about 120° C. to about 250° C., more preferably from about 140° C. to about 200° C.

The fabricated articles of the present invention may be foamed. The foam layer may be produced by an extrusion process or from expandable or foamable particles, moldable foam particles, or beads from which a sheet is formed by expansion and/or coalescing and welding of those particles.

The foam structure may be made by a conventional extrusion foaming process. The structure is generally prepared by heating a polymer material to form a plasticized or melt polymer material, incorporating therein a known blowing agent to form a foamable gel, and extruding the gel through a die to form the foam product. Prior to mixing with the blowing agent, the polymer material is heated to a temperature at or above its glass transition temperature or melting point. The blowing agent may be incorporated or mixed into the melt polymer material by any means known in the art such as with an extruder, mixer or blender. The blowing agent is mixed with the melt polymer material at an elevated pressure sufficient to prevent substantial expansion of the melt polymer material and to generally disperse the blowing agent homogeneously therein. Optionally, a nucleator may be blended in the polymer melt or dry blended with the polymer material prior to plasticizing or melting. The foamable gel is typically cooled to a lower temperature to optimize physical characteristics of the foam structure. The gel is then extruded or conveyed through a die of desired shape to a zone of reduced or lower pressure to form the foam structure. The die can have a substantially rectangular orifice to produce a sheet of the desired width and height. Alternatively, the die can have multiple orifices to produce polymer strands which can be cut to beads. The zone of lower pressure is at a pressure lower than that in which the foamable gel is maintained prior to extrusion through the die. The lower pressure may be superatmospheric or subatmospheric (vacuum), but is preferably at an atmospheric level.

The foam structure may also be formed into foam beads suitable for molding into articles. To make the foam beads, discrete resin particles such as granulated resin pellets are suspended in a liquid medium in which they are substantially insoluble such as water; impregnated with a blowing agent by introducing the blowing agent into the liquid medium at an elevated pressure and temperature in an autoclave or other pressure vessel; and rapidly discharged into the atmosphere or a region of reduced pressure to expand to form the foam beads. This process is well taught in U.S. Pat. Nos. 4,379,859 and 4,464,484, which are incorporated herein by reference.

The foam beads may then be molded by any means known in the art, such as charging the foam beads to the mold, compressing the mold to compress the beads, and heating the beads such as with steam to effect coalescing and welding of the beads to form the article. Optionally, the beads may be impregnated with air or other blowing agent at an elevated pressure and temperature prior to charging to the mold. Further, the beads may be heated prior to charging. The foam beads may then be molded to sheets by a suitable molding method known in the art. Some of the methods are taught in U.S. Pat. Nos. 3,504,068 and 3,953,558.

Various additives may be incorporated in the foam structure, such as stability control agents, nucleating agents, pigments, antioxidants, acid scavengers, ultraviolet absorbers, flame retardants, processing aids or extrusion aids. Some of the additives are described in more detail above.

Fabricated articles of the present invention which are made from filled polymer compositions comprising one or more thermoplastic interpolymers and one or more inorganic fillers in the above-mentioned weight ratios have a substantially improved hardness and tensile modulus while generally maintaining good elongation properties, such as elongation at break, stress at break and energy at break, as compared to fabricated articles made from one or more corresponding thermoplastic interpolymers without inclusion of a filler. Furthermore, the fabricated articles of the present invention generally have good thermal resistance and, depending on the type of filler, improved ignition resistance.

The filled polymer compositions of the present invention can readily be extruded onto a substrate. Alternatively the filled polymer compositions of the present invention can be extruded, milled, or calendered as unsupported films or sheets, for example for producing floor tiles, wall tiles, floor sheeting, wall coverings, or ceiling coverings. They are particularly useful as sound insulating or energy absorbing layers, films, sheets or boards. Films, sheets or boards of a wide thickness range can be produced. Depending on the intended end-use, useful thicknesses generally are from about 0.5 to about 20 mm, preferably from about 1 to about 10 mm. Alternatively, injection molded parts or blow molded articles, such as toys, containers, building and construction materials, automotive components, and other durable goods can be produced from the filled polymer compositions of the present invention.

The following examples are provided to illustrate the present invention. The examples are not intended to limit the scope of the present invention and they should not be so interpreted. Amounts are in weight parts or weight percentages unless otherwise indicated.

TESTING

The properties of the polymers and blends are determined by the following test procedures.

Melt index (MI) is determined by ASTM D-1238 (1979), Condition E (190° C.; 2.16 kg).

Tensile strength, secant modulus, and elongation properties are measured using ASTM D 638, Type C. Elongation at break, stress at break and energy at break are measured at a strain rate of 5 min$^{-1}$.

Flexural modulus is measured using ASTM D 790-95A.

Hardness is measured using a Hardness Tester for Shore A and D according to DIN 53505.

Tabor abrasion is measured according to ASTM F-510.

Scratch testing is carried out using an Erichson Universal Scratch Tester equipped with a 90°–180 μm diameter stylus. A load of 0.1 to 1.0 N is applied to this stylus, and the resulting scratch width is measured after 30 days by a Perthen Surface Profiler. Scratch width and depth is expressed in micrometers.

For indentation testing, ASTM F 142-93 (Standard Test Method for Indentation of Resilient Floor-McBurney Test)

and a modified test is used. In the modified test, a 140 lb. (64 kg) load is applied via a 4.5 mm diameter cylindrical foot. The load is applied for 10 minutes and the initial indentation is measured. The residual indentation is measured after 60 minutes. For the modified test, indentations are reported as a per cent of initial plaque thickness. For residual indentation, the sample is given a "fail" rating if the cylindrical indent foot permanently cuts and damages the surface.

Thermal transition temperatures are measured with differential scanning calorimetry (DSC) and dynamic mechanical spectroscopy (DMS).

Preparation of Ethylene/Styrene Interpolymers ESI-1, ESI-2 and ESI-4

Reactor Description

The single reactor used is a 6 gallon (22.7 L), oil jacketed, Autoclave continuously stirred tank reactor (CSTR). A magnetically coupled agitator with Lightning A-320 impellers provides the mixing. The reactor runs liquid full at 475 psig (3,275 kPa). Process flow is in the bottom and out the top. A heat transfer oil is circulated through the jacket of the reactor to remove some of the heat of reaction. After the exit from the reactor a micromotion flow meter is arranged that measures flow and solution density. All lines on the exit of the reactor are traced with 50 psi (344.7 kPa) steam and insulated.

Procedure

Ethylbenzene solvent is supplied to the mini-plant at 30 psig (207 kPa). The feed to the reactor is measured by a Micro-Motion mass flow meter. A variable speed diaphragm pump controls the feed rate. At the discharge of the solvent pump a side stream is taken to provide flush flows for the catalyst injection line (1 lb/hr (0.45 kg/hr)) and the reactor agitator (0.75 lb/hr ( 0.34 kg/ hr)). These flows are measured by differential pressure flow meters and controlled by manual adjustment of micro-flow needle valves. Uninhibited styrene monomer is supplied to the mini-plant at 30 psig (207 kpa). The feed to the reactor is measured by a Micro-Motion mass flow meter. A variable speed diaphragm pump controls the feed rate. The styrene stream is mixed with the remaining solvent stream. Ethylene is supplied to the mini-plant at 600 psig (4,137 kPa). The ethylene stream is measured by a Micro-Motion mass flow meter just prior to the Research valve controlling flow. A Brooks flow meter/controllers is used to deliver hydrogen into the ethylene stream at the outlet of the ethylene control valve. The ethylene/hydrogen mixture is combined with the solvent/styrene stream at ambient temperature. The temperature of the solvent/monomer as it enters the reactor is reduced to about 5° C. by an exchanger with −5° C. glycol on the jacket. This stream enters the bottom of the reactor. The three component catalyst system and its solvent flush also enter the reactor at the bottom but through a different port than the monomer stream. For preparing ESI-1, ESI-2 and ESI-4, (t-butylamido)dimethyl(tetramethylcyclopentadienyl) silanetitanium (II) 1,3-pentadiene is used as a titanium catalyst and modified methalumoxane Type 3A (MMAO-3A) is used as a second catalyst component. Boron cocatalysts used are tris(pentafluorophenyl)borane (for preparing ESI-1 and ESI-2) or a mixture of methyl($C_{18-22}$-alkyl) ammonium tetrakis(pentafluorophenyl)borates and methyldi ($C_{18-22}$-alkyl)ammonium tetrakis(pentafluorophenyl) borates respectively (for preparing ESI-4). For preparing ESI-1, the molar ratio between the boron cocatalyst and the titanium catalyst is 3:1 and the molar ratio between MMAO-3A and the titanium catalyst is 8:1. For preparing ESI-2 and ESI-4, the molar ratio between the boron cocatalyst and the titanium catalyst is 2:1 and the molar ratio between MMAO-3A and the titanium catalyst is 5:1. Preparation of the catalyst components has taken place in an inert atmosphere glove box. The diluted components are put in nitrogen padded cylinders and charged to the catalyst run tanks in the process area. From these run tanks the catalyst is pressured up with piston pumps and the flow is measured with Micro-Motion mass flow meters. These streams combine with each other and the catalyst flush solvent just prior to entry through a single injection line into the reactor.

Polymerization is stopped with the addition of catalyst kill (water mixed with solvent) into the reactor product line after the micromotion flow meter measuring the solution density. Other polymer additives can be added with the catalyst kill. A static mixer in the line provides dispersion of the catalyst kill and additives in the reactor effluent stream. This stream next enters post reactor heaters that provide additional energy for the solvent removal flash. This flash occurs as the effluent exits the post reactor heater and the pressure drops from 475 psig (3,275 kPa) down to about 250 mm of pressure absolute at the reactor pressure control valve. This flashed polymer enters a hot oil jacketed devolatilizer. Approximately 85 percent of the volatiles are removed from the polymer in the devolatilizer. The volatiles exit the top of the devolatilizer. The stream is condensed with a glycol jacketed exchanger, enters the suction of a vacuum pump and is discharged to a glycol jacket solvent and styrene/ethylene separation vessel. Solvent and styrene are removed from the bottom of the vessel and ethylene from the top. The ethylene stream is measured with a Micro-Motion mass flow meter and analyzed for composition. The measurement of vented ethylene plus a calculation of the dissolved gasses in the solvent/styrene stream are used to calculate the ethylene conversion. The polymer separated in the devolatilizer is pumped out with a gear pump to a ZSK-30 devolatilizing vacuum extruder. The dry polymer exits the extruder as a single strand. This strand is cooled as it is pulled through a water bath. Excess water is blown from the strand with air and the strand is chopped into pellets with a strand chopper.

The monomer amounts and polymerization conditions are provided in Table 1A. The polymer properties are provided in Table 1C further below.

TABLE 1A

| | Reactor Temp. | Solvent Flow | | Ethylene Flow | | Hydrogen Flow | Styrene Flow | | Ethylene reactor Conversion |
|---|---|---|---|---|---|---|---|---|---|
| | ° C. | lb/hr | kg/hr | lb/hr | kg/hr | SCCM* | lb/hr | kg/hr | % |
| ESI-1 | 62.1 | 10.4 | 4.72 | 1.2 | 0.54 | 20.0 | 12.0 | 5.45 | 77.7 |
| ESI-2 | 84.3 | 17.6 | 7.99 | 1.9 | 0.86 | 27.6 | 20.6 | 9.35 | 75.6 |
| ESI-4 | 76.0 | 16.4 | 7.44 | 1.2 | 0.54 | 7.0 | 10.0 | 4.54 | 90.5 |

*cc/min., standardized to 1 atm (760 torr) and 0° C.

Preparation of Ethylene/Styrene Interpolymers ESI-3, ESI-5, ESI-6 and ESI-7

The Polymer is prepared in a 400 gallon (1514 liter) agitated semi-continuous batch reactor. The reaction mixture consists of about 250 gallons (946 liter) of styrene and a solvent comprising a mixture of cyclohexane (85 weight percent) and isopentane (15 weight percent). Prior to addition, solvent, styrene and ethylene are purified to remove water and oxygen. The inhibitor in the styrene is also removed. Inerts are removed by purging the vessel with ethylene. The vessel is then pressure controlled to a set point with ethylene. Hydrogen is added to control molecular weight. Temperature in the vessel is controlled to set-point by varying the jacket water temperature on the vessel. Prior to polymerization, the vessel is heated to the desired run temperature and the catalyst components, i.e. (tert-butylamido)dimethyl(tetramethyl-$\eta$5-cyclopentadienyl) silane dimethyltitatium(IV) catalyst, CAS# 135072-62-7, Tris(pentafluorophenyl)boron, CAS# 001109-15-5, modified methylaluminoxane Type 3A, CAS# 146905-79-5, are flow controlled, on a mole ratio basis of 1/3/5 respectively, combined and added to the vessel. After starting, the polymerization is allowed to proceed with ethylene supplied to the reactor as required to maintain vessel pressure. In some cases, hydrogen is added to the headspace of the reactor to maintain a mole ratio with respect to the ethylene concentration. At the end of the run, the catalyst flow is stopped, ethylene is removed from the reactor, about 1000 ppm of Irganox™ 1010 anti-oxidant is then added to the solution and the polymer is isolated from the solution. The resulting polymers are isolated from solution by either stripping with steam in a vessel (in the case of ESI-3, ESI-6 and ESI-7) or by use of a devolatilizing extruder (in the case of ESI-5). In the case of the steam stripped material, additional processing is required in extruder like equipment to reduce residual moisture and any unreacted styrene.

The monomer amounts and polymerization conditions are provided in Table 1B. The polymer properties are provided in Table 1C.

TABLE 2

Other Materials used in Examples

| Abbreviation | Product Name | Melt Index (gm/10 min) | Density (gm/cc) |
|---|---|---|---|
| ITP-1 | AFFINITY ™ DSH 8501.00 POP (ethylene-1-octene copolymer) | 1.0 | 0.871 |
| ITP-2 | AFFINITY ™ DSH 1500.00 (ethylene- 1-octene copolymer) | 1.0 | 0.902 |
| ITP-3 | AFFINITY ™ SM 8400 (ethylene- 1-octene copolymer) | 30.0 | 0.871 |
| ITP-4 | AFFINITY ™ SM 1300 (ethylene- 1-octene copolymer) | 30.0 | 0.902 |
| MAH | Dow XU-60769.04 (maleic anhydride graft polyethylene, containing 1.0% maleic acid) | 2.5 | 0.955 |
| $CaCO_3$ | for Examples 1–25 obtained from Pfizer ATF-40 (Ground limestone, 40 mesh) | | |
| $CaCO_3$ | for Examples 26–48: Whingdale White (average particle size 6 micron) | | |
| Talc | Owen Corning OC 187A-AA | | |
| Oil | SHELLFLEX ™ 371 | | |

EXAMPLES 1 to 25

In Examples 1 to 25 plaques are prepared via the following steps: 1) Haake bowl mixing, 2) roll milling, and 3) compression molding into plaques. A Haake mixer equipped with a Rheomix 3000 bowl is used. All components of the blend are added to the mixer, and the rotor is operated at 190° C. and 40 rpm for 10 to 15 minutes. The material is then dropped out of the Haake, and fed to a 6 inch diameter× 12 inch wide Farrel two-roll mill set at 175° C. surface temperature. The sheet is either taken off after a 180° wrap or is allowed to wrap 540° before release. The sheet is then cut and compression molded into 3.175 mm thick×101.6

TABLE 1B

| Sample Number | Solvent loaded | | Styrene loaded | | Pressure | | Temp | Total $H_2$ Added | Run Time | Polymer in Solution |
|---|---|---|---|---|---|---|---|---|---|---|
| | lbs | kg | lbs | kg | Psig | kPa | ° C. | Grams | Hours | Wt. % |
| ESI-3 | 252 | 114 | 1320 | 600 | 40 | 276 | 60 | 23 | 6.5 | 18.0 |
| ESI-5 | 1196 | 542 | 225 | 102 | 70 | 483 | 60 | 7.5 | 6.1 | 7.2 |
| ESI-6 | 842 | 382 | 662 | 300 | 105 | 724 | 60 | 8.8 | 3.7 | 6.6 |
| ESI-7 | 252 | 114 | 1320 | 599 | 42 | 290 | 60 | 0 | 2.8 | 11.5 | mm×101.6 mm plaques with a Pasadena Hydraulics Incorporated (PHI) press. The press is operated at 205° C. in a preheat mode at minimal pressure for 3 minutes, and is then pressured up to 15 tons for 2 minutes. Plaques are then removed from the heat and cooled at 15 tons for 3 minutes.

Properties of the compression molded plaques are measured as indicated above.

TABLE 1C

| Interpolymer | Tg ° C. | Melt Index g/10 min | Total % Styrene (NMR) | | Styrene in ethylene/ styrene Interpolymer (NMR) | |
|---|---|---|---|---|---|---|
| | | | mol % | wt. % | mol % | wt. % |
| ESI-1 | na* | 2.0 | 30.3 | 60.0 | na* | na* |
| ESI-2 | na* | 30.0 | 32.0 | 62.0 | 10.3 | 28.4 |
| ESI-3 | 25 | 1.8 | 46.1 | 74.8 | 43.4 | 72.7 |
| ESI-4 | 17 | 2.2 | 41.3 | 70.9 | 40.2 | 70.0 |
| ESI-5 | −17.2 | 0.03 | 10.2 | 28.2 | 9.2 | 27.3 |
| ESI-6 | −12.7 | 0.01 | 21.1 | 48.1 | 18.6 | 45.9 |
| ESI-7 | 24.2 | 0.18 | 48.7 | 76.7 | 43.6 | 74.2 |

*na = not analyzed

Tables 3 and 4 list the compositions and resulting physical properties of Examples 1 to 23 according to the present invention and of Comparative Examples 24 and 25 for 60 percent filled and 85 percent filled formulations, respectively.

TABLE 3

| EXAMPLE # | 1 | 2 | 3 | 4 | 5 | 6 | 7 | 8 | 9 | 10 |
|---|---|---|---|---|---|---|---|---|---|---|
| COMPOSITION - weight percent | | | | | | | | | | |
| CaCO3 | 60 | 60 | 60 | 60 | 60 | 60 | 60 | 60 | 60 | 60 |
| ESI-1 | 40 | | | | | | | | 36 | |
| ESI-3 | | 40 | | 32 | 36 | 28 | 20 | | | 36 |
| ESI-4 | | | 40 | | | | | 20 | | |
| Oil | | | | 8 | | | | | | |
| ITP-1 | | | | | 4 | 12 | 20 | 20 | | |
| ITP-2 | | | | | | | | | | |
| ITP-3 | | | | | | | | | | |
| ITP-4 | | | | | | | | | | |
| MAH | | | | | | | | | 4 | 4 |
| PROPERTIES | | | | | | | | | | |
| Tensile Strength (MPa) | 1.90 | 5.81 | 3.83 | 2.54 | 5.23 | 4.55 | 3.62 | 2.71 | 3.77 | 7.52 |
| 2% Secant Mod (MPa) | 19.50 | 87.45 | 32.12 | 15.12 | 58.50 | 61.83 | 60.83 | 38.94 | 26.94 | 502.62 |
| Flex Modulus (MPa) | 30.88 | 514.69 | 41.34 | 40.20 | 196.90 | 198.41 | 139.48 | 45.69 | 37.43 | 111.04 |
| Elongation at break (%) | 460 | 24.25 | 196 | 309.6 | 68.35 | 36.6 | 244 | 212 | 100.2 | 31.9 |
| Hardness-Shore D | 35.6 | 75.2 | 56.2 | 50.6 | 71.6 | 86.4 | 48 | 36.6 | 40.6 | 70.6 |
| Hardness-Shore A | 86 | 97.6 | 91.4 | 81.2 | 97.8 | 96.6 | 95 | 78.8 | 90.4 | 98 |
| Indentation-14 kg - 1 min (mil) | 24 | 13 | 14 | 19 | 15 | 18 | 20 | 14 | 21 | 14 |
| Indentation-14 kg - 10 min (mil) | 53 | 26 | 23 | 40 | 28 | 31 | 34 | 23 | 47 | 26 |
| Indentation-64 kg (% of thickness) | 76 | 19.8 | 61 | 68 | 31 | 41 | 74 | 67 | 78 | 24 |
| Residual Indentation-64 kg (% of thickness) | 21 | 5.8 | 1.5 | 6.6. | 5.1 | 5.8 | 20.7 | 14 | fail | 7.3 |
| Scratch width (micron) | nt | nt | nt | nt | nt | 48 | nt | nt | nt | 102 |
| Scratch depth (micron) | nt | nt | nt | nt | nt | 2.37 | nt | nt | nt | 2.77 |
| Taber Abrasion (mg/100 rev) | 0.60 | 3.92 | 2.88 | 1.46 | 4.98 | 5.86 | 6.88 | 5.88 | 1.12 | 7.52 | nt = not tested

Examples 1 to 8 illustrate that no additive or polymeric coupling agent is required to achieve good filler holding and solid state properties. The products of Examples 1 to 10 are useful as filled homogeneous sheets, such as floor coverings, or as an individual layer in a heterogeneous structure. The products of Examples 1 to 10 are especially suited for floor sheeting products.

TABLE 4

| EXAMPLE # | 11 | 12 | 13 | 14 | 15 | 16 | 17 | 18 | 19 | 20 | 21 | 22 | 23 | 24* | 25* |
|---|---|---|---|---|---|---|---|---|---|---|---|---|---|---|---|
| COMPOSITION - weight | | | | | | | | | | | | | | | |
| CaCO3 | 85 | 85 | 85 | 85 | 85 | 85 | 85 | 85 | 85 | 85 | 85 | 85 | 85 | 85 | 85 |
| ESI-2 | 15 | | | | | | | | 7.5 | 7.5 | | 13.5 | | | |
| ESI-3 | | 15 | | 12 | 13.5 | 10.5 | 7.5 | 7.5 | | | | | 13.5 | | |
| ESI-4 | | | 15 | | | | | | | | 7.5 | | | | |
| Oil | | | | 3 | | | | | | | | | | | |
| ITP-1 | | | | | | | | | | | | | | | |
| ITP-2 | | | | | | | | | | | | | | | |
| ITP-3 | | | | 1.5 | 4.5 | 7.5 | | 7.5 | | 7.5 | | | 13.5 | | |
| ITP-4 | | | | | | | 7.5 | | 7.5 | | | | | | 13.5 |
| MAH | | | | | | | | | | | | 1.5 | 1.5 | 1.5 | 1.5 |
| PROPERTIES | | | | | | | | | | | | | | | |
| Tensile Strength (MPa) | 5.50 | 1.41 | 11.1 | 4.26 | nt | 8.41 | 6.06 | 13.4 | 4.42 | 9.61 | 6.39 | 6.30 | 2.26 | 5.77 | 11.8 |
| 2% Secant Mod (MPa) | 132 | 515 | 234 | 54 | 569 | 386 | 282 | 757 | 178 | 607 | 225 | 361 | 788 | 315 | 101 |
| Flex Modulus (Mpa) | 182 | 170 | 273 | 77 | 210 | 120 | 660 | 170 | 235 | 153 | 277 | 110 | 227 | 587 | 272 |
| Elongation at break (%) | 2.45 | 0.15 | 5.9 | 8.7 | | 2.05 | 5.4 | 0.65 | 9.2 | 3.6 | 6.3 | 3.65 | 0.05 | 5 | 1.7 |
| COMPOSITION - weight | | | | | | | | | | | | | | | |
| Hardness-Shore D | 87 | 85 | 82 | 63 | 83 | 73 | 65 | 74 | 53 | 66 | 63 | 70 | 78 | 57 | 70 |
| Hardness-Shore A | 96 | 98 | 96 | 92 | 98 | 99 | 98 | 98 | 95 | 98 | 96 | 98 | 99 | 97 | 98 |
| Indentation-14 kg - 1 min | 12 | 4 | 5 | 14 | 5 | 8 | 10 | 5 | 14 | 6 | 8 | 8 | 4 | 8 | 4 |
| Indentation-14 kg - 10 | 21 | 7 | 10 | 29 | 8 | 13 | 15 | 7 | 19 | 8 | 13 | 12 | 6 | 11 | 5 |
| Indentation-64 kg (% of thickness) | 71 | 4.1 | 9 | 61 | 4.8 | nt | 28 | 5.2 | 89 | 9.9 | 30 | 15.5 | 7.5 | 91 | 5.8 |
| Residual Indentation-64 kg (% of thickness) | fail | 1.7 | 0.7 | 11.8 | 2.1 | 2.5 | 6.9 | 0.8 | fail | 2.3 | 7.5 | 7.4 | 2.8 | fail | 1.6 |
| Scratch width (micron) | 77 | 77 | 59 | 64 | 56 | 73 | 80 | 79 | 69 | nt | nt | 82 | 66 | 105 | 101 |

TABLE 4-continued

| EXAMPLE # | 11 | 12 | 13 | 14 | 15 | 16 | 17 | 18 | 19 | 20 | 21 | 22 | 23 | 24* | 25* |
|---|---|---|---|---|---|---|---|---|---|---|---|---|---|---|---|
| Scratch depth (micron) | 4.80 | 2.51 | 1.89 | 5.26 | 2.05 | 5.65 | 4.97 | 5.16 | 12.4 | nt | nt | 7.93 | 3.46 | 9.07 | 6.19 |
| Taber Abrasion (mg/100 | 12.7 | 14.8 | 12.7 | 12.3 | 15.8 | 19.9 | 21.4 | nt | 18.6 | 17.4 | 21.7 | 18.2 | nt | 17.8 | 15.7 |

*Comparative Example
nt = not tested

The plaques of Examples 11 to 23 have a considerably higher high scratch resistance than the plaques of Comparative Examples 24 and 25.

Examples 11 to 21 illustrate that no additive or polymeric coupling agent is required to achieve good filler holding and solid state properties.

The plaque of Example 13 shows an exceptional combination of flexibility and indentation resistance, and is particularly useful in or as a floor tile product with good installability and good conformability to uneven and contoured surfaces.

The products of Examples 11 to 23 are useful as a filled homogeneous sheets, such as floor coverings, or as an individual layer in a heterogeneous structure. The products of Examples 11 to 23 are especially suited for floor tile products.

EXAMPLES 26 to 48

In Examples 26 to 48 plaques are produced as described in above in Examples 1 to 27 except that no roll milling process is applied and the dimensions of the plaques are 5 in×5 in×0.08 in (127 mm×127 mm×2.03 mm).

TABLE 5

| EXAMPLE # | 26* | 27 | 28 | 29 | 30 | 31 | 32 | 33* | 34 | 35 | 36 | 37 | 38 | 39 | 40 |
|---|---|---|---|---|---|---|---|---|---|---|---|---|---|---|---|
| COMPOSITION - weight | | | | | | | | | | | | | | | |
| CaCO3 | | 50 | | | 20 | | | | 20 | 50 | 80 | | | | |
| talc | | | 50 | | | 20 | | | | | | 20 | 50 | | |
| glass fibers | | | | 50 | | | 20 | | | | | | | 20 | 50 |
| ESI-5 | 100 | 50 | 50 | 50 | 80 | 80 | 80 | | | | | | | | |
| ESI-6 | | | | | | | | 100 | 80 | 50 | 20 | 80 | 50 | 80 | 50 |
| PROPERTIES | | | | | | | | | | | | | | | |
| Tensile Strength (MPa) | | | | | | | | | | | | | | | |
| 2% Secant Mod (MPa) | | | | | | | | | | | | | | | |
| Flex Modulus (MPa) | 20 | 69.6 | 233.7 | 804 | 33.8 | 64.8 | 293.1 | 7.6 | 9.7 | 17.9 | 168.9 | 15.9 | 75.2 | 246.8 | 1228 |
| Yield stress (MPa) | 2 | 7 | 11 | 16 | | | | | | | | | | | |
| Elongation (%) at break | 378 | 320 | 102 | 7 | 341 | 347 | 178 | 147 | 581 | 581 | 21 | 602 | 503 | 25 | 7 |
| Stress at break (MPa) | 34.3 | 17.1 | 12.2 | 11.4 | 30.2 | 32.7 | 12 | 2.9 | 15 | 8.8 | 7.7 | 16.2 | 8.6 | 5.8 | 19 |
| Energy at break (Nm) | 145.1 | 158.7 | 59.7 | 3.5 | 162.7 | 179 | 84.1 | 12.2 | 105.8 | 93.6 | 6.8 | 154.6 | 153.2 | 5.4 | 5.4 |

| EXAMPLE # | 41* | 42 | 43 | 44 | 45 | 46 | 47 | 48 |
|---|---|---|---|---|---|---|---|---|
| COMPOSITION - weight | | | | | | | | |
| CaCO3 | | 20 | 50 | 80 | | | | |
| talc | | | | | 20 | 50 | | |
| glass fibers | | | | | | | 20 | 50 |
| ESI-7 | 100 | 80 | 50 | 20 | 80 | 50 | 80 | 50 |
| PROPERTIES | | | | | | | | |
| Tensile Strength (MPa) | | | | | | | | |
| 2% Secant Mod (MPa) | | | | | | | | |
| Flex Modulus (MPa) | 594.4 | 2123 | 3161 | 5543 | 3827 | 5202 | 2417 | 6244.8 |
| Yield stress (MPa) | 6 | 17 | 22 | 34 | | | | |
| Elongation (%) at break | 258 | 198 | 66 | 1 | 244 | 22 | 9 | 1 |
| Stress at break (MPa) | 21.6 | 17 | 13.7 | 34.3 | 22.9 | 26.4 | 27.2 | 57.7 |
| Energy at break (Nm) | 118 | 119.3 | 42 | 0.7 | 176.3 | 27.1 | 6.8 | 1.4 |

*Comparative Example
nt = not tested

What is claimed is:

1. A filled polymer composition comprising
   (A) from about 5 to about 90 percent of one or more thermoplastic substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s), and
   (B) from about 10 to about 95 percent of one or more inorganic fillers, the amounts of (A) and (B) being based on the total weight of (A) and (B),
   wherein said one or more interpolymers contain interpolymerized from about 35 to about 99.5 mole percent of one or more α-olefin monomers and from about 0.5 to about 65 mole percent of one or more vinylidene aromatic monomers and/or one or more hindered aliphatic or cycloaliphatic vinylidene monomers, and optionally other polymerizable ethylenically unsaturated monomer(s).

2. The filled polymer composition of claim 1 wherein said one or more interpolymers contain interpolymerized from about 50 to about 80 mole percent of one or more α-olefin monomers and from about 20 to about 50 mole percent of one or more vinylidene aromatic monomers and/or one or more hindered aliphatic or cycloaliphatic vinylidene monomers, and optionally other polymerizable ethylenically unsaturated monomer(s).

3. The filled polymer composition of claim 1 wherein the filler is alumina trihydrate or magnesium hydroxide.

4. The filled polymer composition of claim 1 wherein the filler is alumina trihydrate or magnesium hydroxide and the amount of the filler is from about 40 to about 90 percent, based on the total weight of the interpolymer(s) and filler.

5. A filled polymer composition comprising
(A) from about 5 to about 90 percent of one or more thermoplastic substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s),
(B) from about 10 to about 95 percent of one or more inorganic fillers, the amounts of (A) and (B) being based on the total weight of (A) and (B), and
(C) a coupling agent.

6. The composition of claim 5 wherein the coupling agent is selected from the group consisting of maleic anhydride grafted polyethylenes, maleic anhydride grafted polypropylenes, silicon coupling agents and silane coupling agents.

7. The composition of claim 5 which further comprises a peroxide.

8. The composition of claim 5 wherein the filler is an ignition resistant filler.

9. A filled polymer composition comprising
(A) from about 5 to about 90 percent of one or more thermoplastic substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s),
(B) from about 10 to about 95 percent of one or more inorganic fillers, the amounts of (A) and (B) being based on the total weight of (A) and (B), and
(C) an additive selected from the group consisting of an antioxidant, a hindered phenol, a hindered phosphite, a light stabilizer, a plasticizer, a tackifier, a wax, a processing aid, a crosslinking agent, a colorant, and a pigment.

10. The composition of claim 9 wherein the light stabilizer is a hindered amine.

11. The composition of claim 9 wherein the plasticizer is selected from the group consisting of dioctylphthalate and epoxidized soy bean oil.

12. The composition of claim 9 wherein the tackifier is a hydrocarbon tackifier.

13. The composition of claim 9 wherein the wax is polyethylene wax.

14. The composition of claim 9 wherein the processing aid is selected from the group consisting of oils, stearic acid, and metal salts of stearic acid.

15. The composition of claim 14 wherein the processing aid is selected from the group consisting of stearic acid and metal salts of stearic acid.

16. A filled polymer composition comprising
(A) from about 5 to about 90 percent of one or more thermoplastic substantially random interpolymers prepared by polymerizing one or more α-olefin monomers with one or more vinylidene aromatic monomers and/or one or more hindered aliphatic or cycloaliphatic vinylidene monomers, and optionally with other polymerizable ethylenically unsaturated monomer(s),
(B) from about 10 to about 95 percent of one or more inorganic fillers, the amounts of (A) and (B) being based on the total weight of (A) and (B), wherein the inorganic filler is selected from the group consisting of alumina trihydrate, marble dust, cement dust, clay, feldspar, silica, glass, fumed silica, alumina, magnesium oxide, magnesium hydroxide, antimony oxide, zinc oxide, aluminum silicate, calcium silicate, titanium dioxide, titanates, glass microspheres, and chalk.

17. The composition of claim 16 wherein the filler is aluminum trihydrate or magnesium hydroxide.

18. The composition of claim 17 which further comprises a silane coupling agent.

19. The filled polymer composition of any one of claims 5–18 wherein said one or more interpolymers is an interpolymer of ethylene and styrene.

20. The filled polymer compositions of any one of claims 5–18 further comprising up to about 50 weight percent of one or more additional polymeric components(s), based on the total weight of the filled polymer composition.

21. A fabricated article made from the polymer composition of any one of claims 5–18.

* * * * *